United States Patent
Mizuno et al.

(10) Patent No.: US 12,135,399 B2
(45) Date of Patent: Nov. 5, 2024

(54) METHOD OF OPTIMIZING SEISMIC ACQUISITION

(71) Applicant: Schlumberger Technology Corporation, Sugar Land, TX (US)

(72) Inventors: Takashi Mizuno, Sugar Land, TX (US); Pierre Bettinelli, Cedex (FR); Joel Herve Le Calvez, Sugar Land, TX (US)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 0 days.

(21) Appl. No.: 18/697,947

(22) PCT Filed: Oct. 13, 2022

(86) PCT No.: PCT/US2022/046545
§ 371 (c)(1),
(2) Date: Apr. 2, 2024

(87) PCT Pub. No.: WO2023/064453
PCT Pub. Date: Apr. 20, 2023

(65) Prior Publication Data
US 2024/0329270 A1    Oct. 3, 2024

Related U.S. Application Data

(60) Provisional application No. 63/255,230, filed on Oct. 13, 2021.

(51) Int. Cl.
*G01V 1/42* (2006.01)
*G01V 1/00* (2024.01)

(52) U.S. Cl.
CPC .............. *G01V 1/42* (2013.01); *G01V 1/003* (2013.01); *G01V 2200/14* (2013.01)

(58) Field of Classification Search
CPC ....... G01V 1/42; G01V 1/003; G01V 2200/14
(Continued)

(56) References Cited

U.S. PATENT DOCUMENTS

2006/0203614 A1* 9/2006 Harmon ............... G01V 1/42
367/57
2011/0176386 A1* 7/2011 Lapilli .................. G01V 1/282
367/73

(Continued)

OTHER PUBLICATIONS

Search Report and Written Opinion of International Patent Application No. PCT/US2022/046545 on Feb. 14, 2023; 9 pages.

*Primary Examiner* — Daniel L Murphy
*Assistant Examiner* — Aime M Ndure
(74) *Attorney, Agent, or Firm* — Jeffrey D. Frantz

(57) ABSTRACT

A method for optimizing a seismic survey design includes obtaining a well trajectory, determining a depth range and a measurement interval for the seismic survey, determining an optimal seismic shot position for each receiver within the depth range using an inverse function, determining one or more potential seismic shot configurations that each include a number of seismic shots, a location for each of the number of seismic shots, and a power of each of the seismic shots, determining an estimate of a data quality for each of the determined one or more potential seismic shot configurations using an objective function, and determining an optimum seismic survey design based on the determined estimated data quality for each of the determined one or more potential seismic shot configurations, wherein the estimated data quality for the optimum seismic survey design is greater than a predetermined minimum threshold.

10 Claims, 3 Drawing Sheets

(58) Field of Classification Search
USPC .......................................................... 367/38
See application file for complete search history.

(56) References Cited

U.S. PATENT DOCUMENTS

| | | | |
|---|---|---|---|
| 2019/0154855 A1* | 5/2019 | Eick ......................... | G01V 1/28 |
| 2019/0293814 A1* | 9/2019 | Horne ....................... | G01V 1/42 |
| 2019/0383965 A1* | 12/2019 | Salman ..................... | G01V 3/18 |
| 2019/0391286 A1* | 12/2019 | Hardouin ................. | G01V 1/003 |
| 2021/0003724 A1* | 1/2021 | Sun .......................... | G01V 1/282 |

* cited by examiner

METHOD OF OPTIMIZING SEISMIC ACQUISITION

CROSS-REFERENCE TO RELATED APPLICATIONS

The present application is a National Stage Entry of PCT/US2022/046545, filed Oct. 13, 2022, which claims priority to U.S. Provisional Patent Application 63/255,230, filed Oct. 13, 2021, the entirety of which is incorporated by reference.

BACKGROUND

Field

The present disclosure generally relates to methods and systems to optimize seismic acquisition.

Description of the Related Art

The value of most oilfield technologies resides in their ability to reduce risk. Risk reduction is often performed by increasing the understanding of the elements at hand. Borehole seismic surveys deliver on such objectives in the fields of exploration, production, and short-term and long-term monitoring, such as carbon capture and underground storage.

Borehole seismic surveys mainly provide critical depth and velocity information as well as high-resolution images extending hundreds of meters around the monitoring wellbore and into the inter-well volume. In some cases, the borehole seismic survey technology can be used to monitor fluid movement and predict lithologies (i.e., formation properties) when properly calibrated.

Borehole seismic surveys are typically conducted using controlled sources located at the surface which are triggered to produce a series of waves that propagate to sensors located in a nearby wellbore. Those sensors may be three component sensors or, with the advances in the fiber optic domain, single component sensors. In the field of borehole seismic acquisition, understanding the source(s), receiver(s) and medium in between is key to properly process data recorded.

SUMMARY OF THE INVENTION

Borehole seismic surveys may be optimized by conducting a "survey design" to evaluate and optimize source and receiver configurations within a wellbore. Determining the optimal location of one or more sources and the optimal power of those one or more sources is part of the survey design process. To perform survey design we need two technologies. The first technology is forward modeling (simulation) of seismic attributes, such as the amplitude, waveform, and travel-time of seismic signals, for given source and receiver configurations. The second is the optimization of survey design using the forward modeling above. Usually such an optimization is done by experienced geophysicists relying on a qualitative analysis of attributes computed by the forward modeling. But this is not a viable approach for complex survey configurations and/or wellbores. Inversion is the way to achieve optimization of source and sensor locations considering a given objective for a specific survey.

The present method inverts for the source position(s) for a given quality target with a minimum number of shots. The quality target is defined by the user based on objective of the survey.

BRIEF DESCRIPTION OF THE FIGURES

Certain embodiments, features, aspects, and advantages of the disclosure will hereafter be described with reference to the accompanying drawings, wherein like reference numerals denote like elements. It should be understood that the accompanying figures illustrate the various implementations described herein and are not meant to limit the scope of various technologies described herein.

DETAILED DESCRIPTION

In the following description, numerous details are set forth to provide an understanding of some embodiments of the present disclosure. It is to be understood that the following disclosure provides many different embodiments, or examples, for implementing different features of various embodiments. Specific examples of components and arrangements are described below to simplify the disclosure. These are, of course, merely examples and are not intended to be limiting. However, it will be understood by those of ordinary skill in the art that the system and/or methodology may be practiced without these details and that numerous variations or modifications from the described embodiments are possible. This description is not to be taken in a limiting sense, but rather made merely for the purpose of describing general principles of the implementations. The scope of the described implementations should be ascertained with reference to the issued claims.

As used herein, the terms "connect", "connection", "connected", "in connection with", and "connecting" are used to mean "in direct connection with" or "in connection with via one or more elements"; and the term "set" is used to mean "one element" or "more than one element". Further, the terms "couple", "coupling", "coupled", "coupled together", and "coupled with" are used to mean "directly coupled together" or "coupled together via one or more elements". As used herein, the terms "up" and "down"; "upper" and "lower"; "top" and "bottom"; and other like terms indicating relative positions to a given point or element are utilized to more clearly describe some elements. Commonly, these terms relate to a reference point at the surface from which drilling operations are initiated as being the top point and the total depth being the lowest point, wherein the well (e.g., wellbore, borehole) is vertical, horizontal or slanted relative to the surface.

The optimization of seismic acquisition can be treated as an inversion problem of source and receiver attributes considering constraints of cost and quality of data. The source attributes may include a number of seismic shots, a seismic shot position for each of the number of seismic shots, and a source effort for each of the number of seismic shots. Source effort may include the number of sweeps in case of a vibration source or a power of the vibration source. Receiver attributes may include a number of receivers, a receiver position for each of the number of receivers, and a type of receiver for each of the number of receivers.

Figure 1:
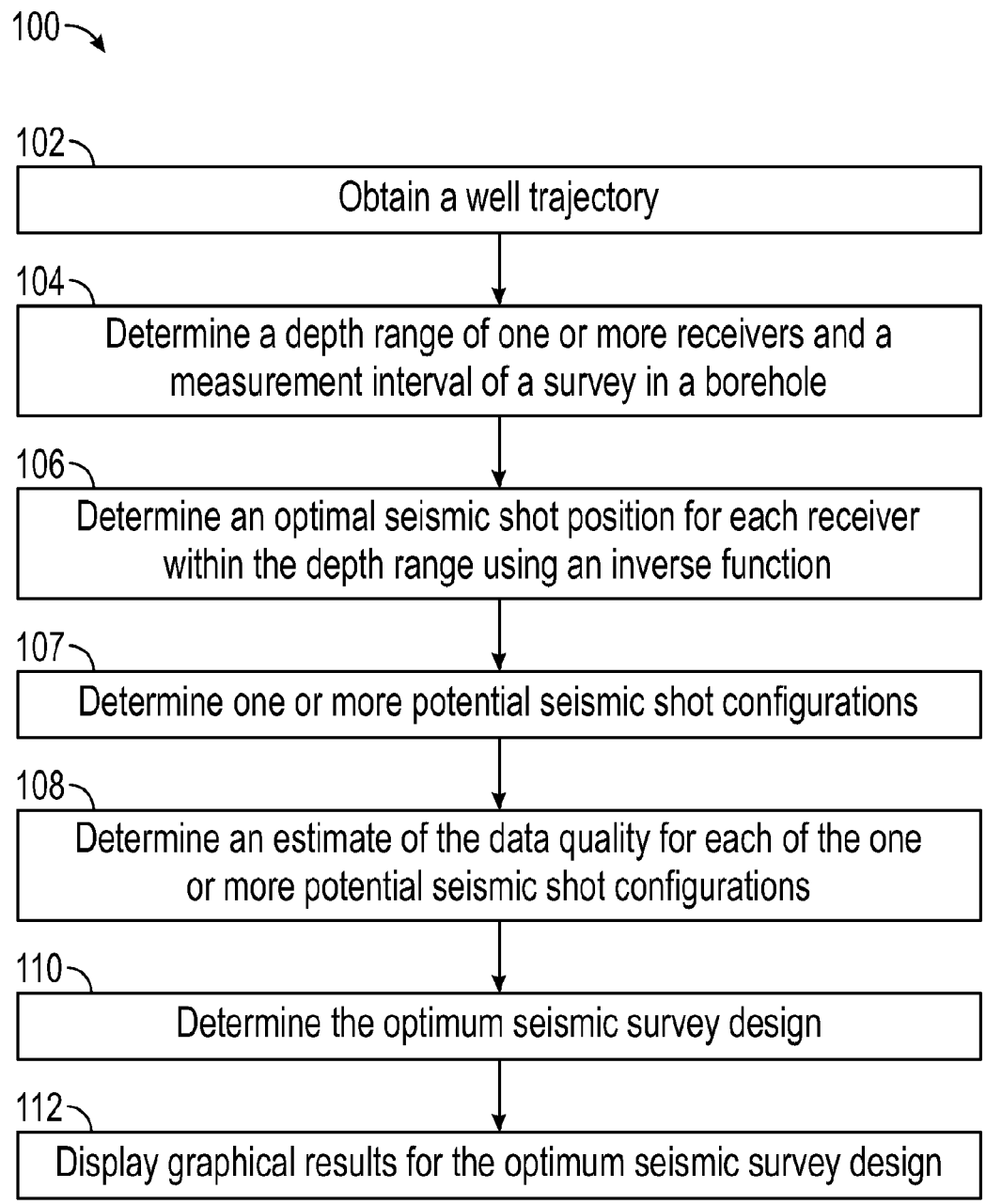
FIG. 1 depicts a flowchart for a method of automated survey design according to one or more embodiments of the invention.

Referring to FIG. 1, a method 100 of optimizing seismic survey design according to one or more embodiments is depicted. In one or more embodiments, the method 100 may optimize source attributes for a borehole seismic survey with distributed acoustic sensing ("DAS") considering well trajectory and depth range to be measured. The method 100 may use an inverse function to determine the minimum number of seismic shots required for a given quality standard.

At step 102, the method 100 may include obtaining a well trajectory. By way of example, the well trajectory may be obtained by conducting a well deviation survey. Further, at step 104, a depth range of one or more receivers (e.g., a range of depths where seismic receivers are disposed), and a measurement interval (e.g., the distance between receivers within a wellbore) of a survey in a borehole may be determined. In one or more embodiments, the one or more receivers may be disposed along a fiberoptic cable disposed within the wellbore.

At step 106, the method 100 may also include determining an optimal seismic shot position for each receiver within the depth range using an inverse function based on the depth range of the one or more receivers and the measurement interval. Further, at step 107, the method 100 may also include determining one or more potential seismic shot configurations. Each of the one or more potential seismic shot configurations includes a number of seismic shots, a location for each of the number of seismic shots, and a power of each of the seismic shots. Further, each potential seismic shot configuration may be determined by determining an optimal seismic shot position for each of one or more seismic shots based on the determined optimal seismic shot position for each receiver within the depth range. In one or more embodiments, the seismic shot position for each of the potential seismic shot configurations may be determined by estimating a location based on averaging the optimal seismic shot positions for the one or more receivers within the depth range among the total number of seismic shots of the potential seismic shot configuration. By way of example, at step 107, the seismic shot configuration for a single seismic shot seismic survey may be determined by estimating the optimal seismic shot position of the single seismic shot by averaging the determined optimal seismic shot positions for each receiver, the seismic shot configuration for a two seismic shot seismic survey may be determined by estimating the optimal seismic shot positions of each of the two seismic shots by averaging the determined optimal seismic shot positions for each receiver, etc. Thus, the same estimated optimal shot positions may be used to determine the potential seismic shot configuration for each possible number of seismic shots allowed in the seismic survey.

Further, at step 108, for each potential seismic shot configuration, an objective function may be used to determine an estimate of the data quality that would be received by the receivers as a function of the number of seismic shots, the position of each of the number of seismic shots, and the power of each of the seismic shots. The objective function used may consider variations in a way receivers are coupled to the formation along the depth of the wellbore, variations of source signatures including coupling to the ground, and the radiation pattern from the source. In one or more embodiments, the objective function may be performed for each potential seismic shot configuration until a predetermined minimum threshold is achieved for the data quality. In one or more embodiments, the predetermined threshold of data quality is defined by a user based on the subject of the seismic survey. Further, the data quality may be a measure based on signal to noise ratio of the waveforms received at each receiver from each seismic shot. Additionally, in one or more embodiments, the objective function of step 108 may consider the maximum number of seismic shots and the maximum power of each seismic shot allowed in the seismic survey as a second threshold and a third threshold, respectively, in case there is the constraint in terms of logistics and environmental impacts.

Additionally, at step 110, the optimum seismic survey design may be determined based on the determined estimated data quality for each potential seismic shot configuration. When the predetermined minimum threshold for data quality is achieved, the potential seismic shot configuration containing the least number of seismic shots that meets the predetermined minimum threshold for data quality may be determined to be the optimum seismic survey design (i.e., the optimum number of seismic shots as well as the optimal seismic shot positions for each of those seismic shots at the lowest power). Further, in one or more embodiments, the potential seismic shot configuration containing the least number of seismic shots at the lowest power that meets the predetermined minimum threshold for data quality may be determined to be the optimum seismic survey design.

Figure 2:
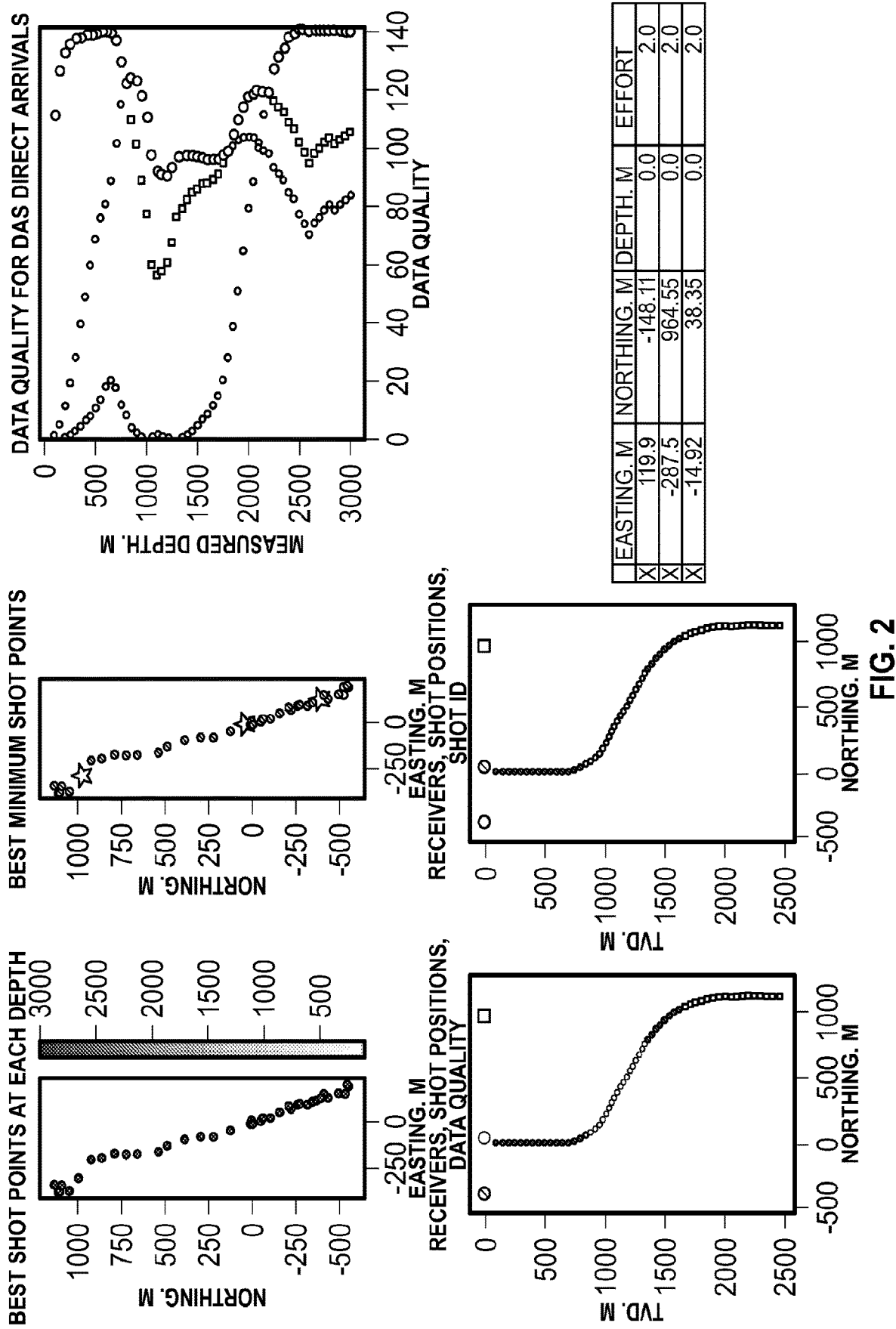
FIG. 2 depicts an example of a graphical output for a given automated survey design according to one or more embodiments of the invention.

Further, at step 112, the method 100 may include displaying graphical results, as shown in FIG. 2, for the optimum seismic survey design. Referring to FIG. 2, the top left graph shows the solution of step 106; the top middle graph shows the solution of step 107 for the optimum seismic survey design; the top right graph shows the solution of step 108 for the optimum seismic survey design; the bottom left graph shows a cross sectional view of the data quality along the wellbore for the optimum seismic survey design; the bottom middle graph shows the seismic shot for which data will be recorded by each receiver along the wellbore based on the optimum seismic survey design; and the bottom right chart displays the position of each seismic shot and the power of each seismic shot for the optimum seismic survey design.

By way of example, the objective function of step 108 may be a function of data quality which is defined by the signal to noise ratio of the waveforms from a seismic shot that each receiver will receive. While each survey has different objectives, the best signal to noise ratio (SNR) of data is desired in most seismic surveys. Considering propagation of a seismic waveform from a seismic shot, the following equation provides the SNR of DAS data at given measurement configuration. Measurement configuration includes but is not limited to the well trajectory and the depth of measurement point.

$$SNR = \frac{D_{DAS}}{A_N}$$

$D_{DAS}$ is the amplitude of signal of DAS data, $A_N$ is the noise amplitude.

For a given measurement configuration and power of the seismic shot, the amplitude of DAS data can be determined as follows:

$$D_{DAS} = S \times P \times R$$

S is the amplitude at the source in particle velocity, and P is the amplitude decay factor during the propagation of seismic wave to the receiver from the source, and R is the receiver response. For simplicity isotropic source radiation is assumed. Amplitude decay factor is derived from both measurement and source location assuming a homogenous isotropic medium. In case of DAS, the inverse of apparent velocity ($V_A$) is used for receiver response since DAS data is scaled by local apparent velocity in infinite strain as the first order approximation of DAS measurement.

Figure 3:
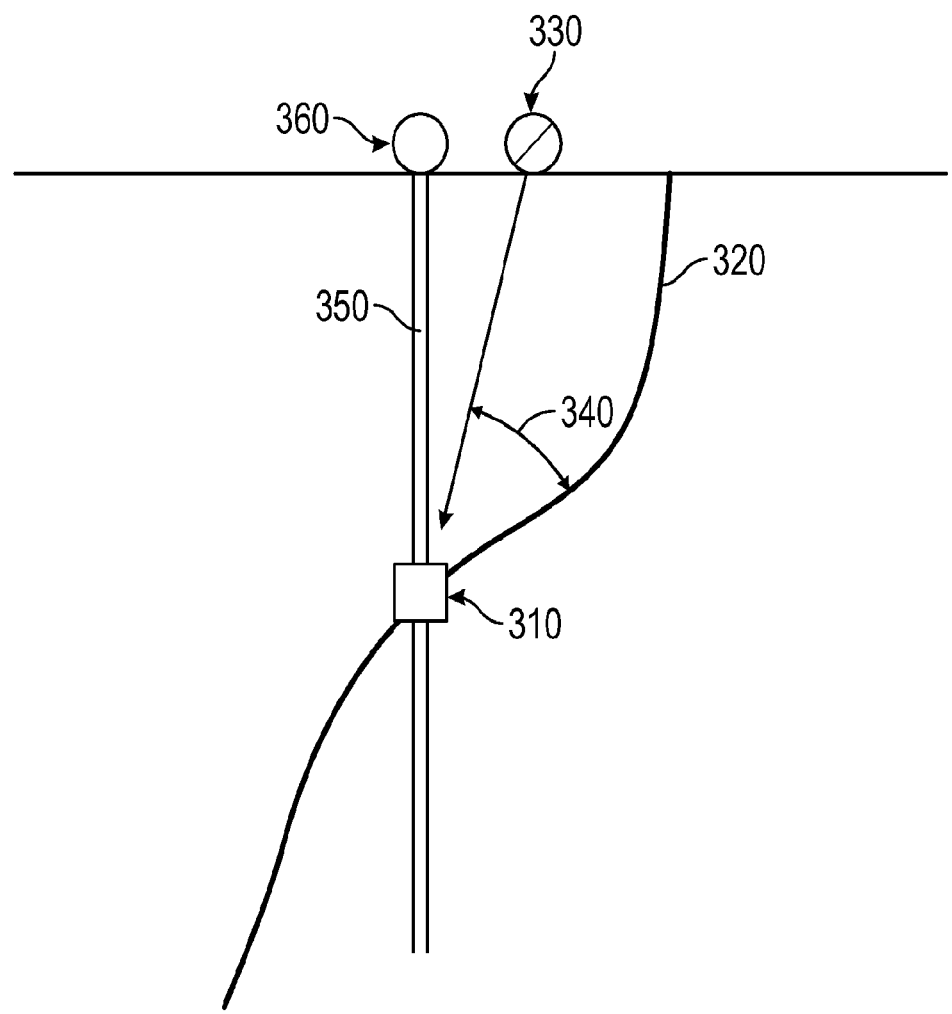
FIG. 3 depicts a relationship between a well trajectory and a seismic shot for a real distributed acoustic sensing ("DAS") measurement and a virtual DAS measurement according to one or more embodiments of the invention.

Referring to FIG. 3, a relationship between a well trajectory and a seismic shot for a real distributed acoustic sensing ("DAS") measurement and a virtual DAS measurement according to one or more embodiments of the invention is depicted. The real DAS measurement for a given depth 310 is made based on a real DAS 320 and a real seismic shot 330 which will produce seismic waveforms having a ray incident angle 340 at the receiver (not shown) at the given depth 310. Further, the virtual DAS measurement for a given depth 310 is made based on a virtual DAS 350 that is positioned directly vertical to the receiver at the given depth and a virtual seismic shot 360 that is directly in line with the vertical virtual DAS 350.

To compute SNR, precise knowledge for all parameters in the above equations, which is not practical. Therefore, the objective function can be defined as the ratio of actual SNR to the SNR of the best virtual reference. As shown in FIG. 3, the best virtual reference is the case when a seismic survey is carried out in a vertical well with the seismic source located just above the measurement point within the wellbore. Thus, we may calculate the SNR of the virtual reference and the real SNR using the following equations:

$$SNR_{ref} = \frac{D_{refDAS}}{A_{refN}} = \frac{S \times P_{ref} \times \frac{1}{V_{refA}}}{A_{refN}}$$

$$SNR_{real} = \frac{D_{realDAS}}{A_{realN}} = \frac{\sqrt{E} \times S \times P_{real} \times \frac{1}{V_{realA}} \times \cos\theta}{A_{realN}}$$

where $\theta$ is the ray incident angle as shown in FIG. 3 and E is the effort factor, which is the number of sweeps in case of a vibration source. By taking the ratio of actual SNR to the SNR of the best virtual reference, the objective function may be defined in terms of SNR as follows:

$$O_{SNR} = \frac{SNR_{real}}{SNR_{ref}} = \cos\theta^2 \times \frac{P_{real}}{P_{ref}} \times \sqrt{E}$$

where the noise amplitude is assumed to be the same between the virtual reference configuration and the real configuration (assuming noise amplitude is solely coming from measurement system, not the well condition). This indicates the SNR objective function is computed by the geometry of source and DAS measurement points, and the effort factor.

Language of degree used herein, such as the terms "approximately," "about," "generally," and "substantially" as used herein represent a value, amount, or characteristic close to the stated value, amount, or characteristic that still performs a desired function or achieves a desired result. For example, the terms "approximately," "about," "generally," and "substantially" may refer to an amount that is within less than 10% of, within less than 5% of, within less than 1% of, within less than 0.1% of, and/or within less than 0.01% of the stated amount. As another example, in certain embodiments, the terms "generally parallel" and "substantially parallel" or "generally perpendicular" and "substantially perpendicular" refer to a value, amount, or characteristic that departs from exactly parallel or perpendicular, respectively, by less than or equal to 15 degrees, 10 degrees, 5 degrees, 3 degrees, 1 degree, or 0.1 degree.

Although a few embodiments of the disclosure have been described in detail above, those of ordinary skill in the art will readily appreciate that many modifications are possible without materially departing from the teachings of this disclosure. Accordingly, such modifications are intended to be included within the scope of this disclosure as defined in the claims. It is also contemplated that various combinations or sub-combinations of the specific features and aspects of the embodiments described may be made and still fall within the scope of the disclosure. It should be understood that various features and aspects of the disclosed embodiments can be combined with, or substituted for, one another in order to form varying modes of the embodiments of the disclosure. Thus, it is intended that the scope of the disclosure herein should not be limited by the particular embodiments described above.

What is claimed is:

1. A method for optimizing a seismic survey design comprising:
    obtaining a well trajectory;
    determining a depth range of one or more receivers and a measurement interval for the seismic survey;
    determining an optimal seismic shot position for each of the one or more receivers within the depth range using an inverse function based on the depth range of the one or more receivers and the measurement interval for the seismic survey;
    determining one or more potential seismic shot configurations, wherein each of the one or more potential seismic shot configurations includes a number of seismic shots, a location for each of the number of seismic shots, and a power of each of the seismic shots, and wherein each of the one or more potential seismic shot configurations are determined based on the optimal seismic shot position for each of the one or more receivers within the depth range;
    determining an estimate of a data quality for each of the determined one or more potential seismic shot configurations using an objective function;
    determining an optimum seismic survey design based on the determined estimated data quality for each of the determined one or more potential seismic shot configurations, wherein the estimated data quality for the optimum seismic survey design is greater than a pre-determined minimum threshold.

2. The method of claim 1, wherein the well trajectory is obtained by conducting a well deviation survey.

3. The method of claim 1, wherein the one or more receivers are disposed along a fiberoptic cable.

4. The method of claim 1, wherein the seismic shot position of each of the number of seismic shots of each of the one or more potential seismic shot configurations is determined by averaging all of the optimal seismic shot positions for the one or more receivers within the depth range.

5. The method of claim 1, wherein the data quality for each of the determined one or more potential seismic shot configurations is based on a signal to noise ratio of potential waveforms received at each receiver from each seismic shot of each potential seismic shot configuration.

6. The method of claim 1, wherein the objective function used to estimate the data quality for each of the determined one or more potential seismic shot configurations is a function of the ratio of the signal to noise ratio of the determined potential seismic shot configuration to the signal to noise ratio of a virtual reference configuration.

7. The method of claim 6, wherein the objective function is defined as:

$$O_{SNR} = \frac{SNR_{real}}{SNR_{ref}} = \cos\theta^2 \times \frac{P_{real}}{P_{ref}} \times \sqrt{E}$$

8. The method of claim 1, wherein determining the optimum seismic survey design comprises:
   determining the potential seismic shot configuration for which the estimated data quality is greater than the predetermined minimum threshold that has the least number of seismic shots.

9. The method of claim 8, wherein determining the optimum seismic survey design comprises:
   determining the potential seismic shot configuration for which the estimated data quality is greater than the predetermined minimum threshold that has the least number of seismic shots at the lowest power.

10. The method of claim 1, further comprising displaying graphical results for the optimum seismic survey design.

\* \* \* \* \*